No. 684,798. Patented Oct. 22, 1901.
S. K. DENNIS.
COMBINED MOWING MACHINE AND HAY RAKE.
(Application filed June 20, 1900.)
(No Model.) 5 Sheets—Sheet 4.
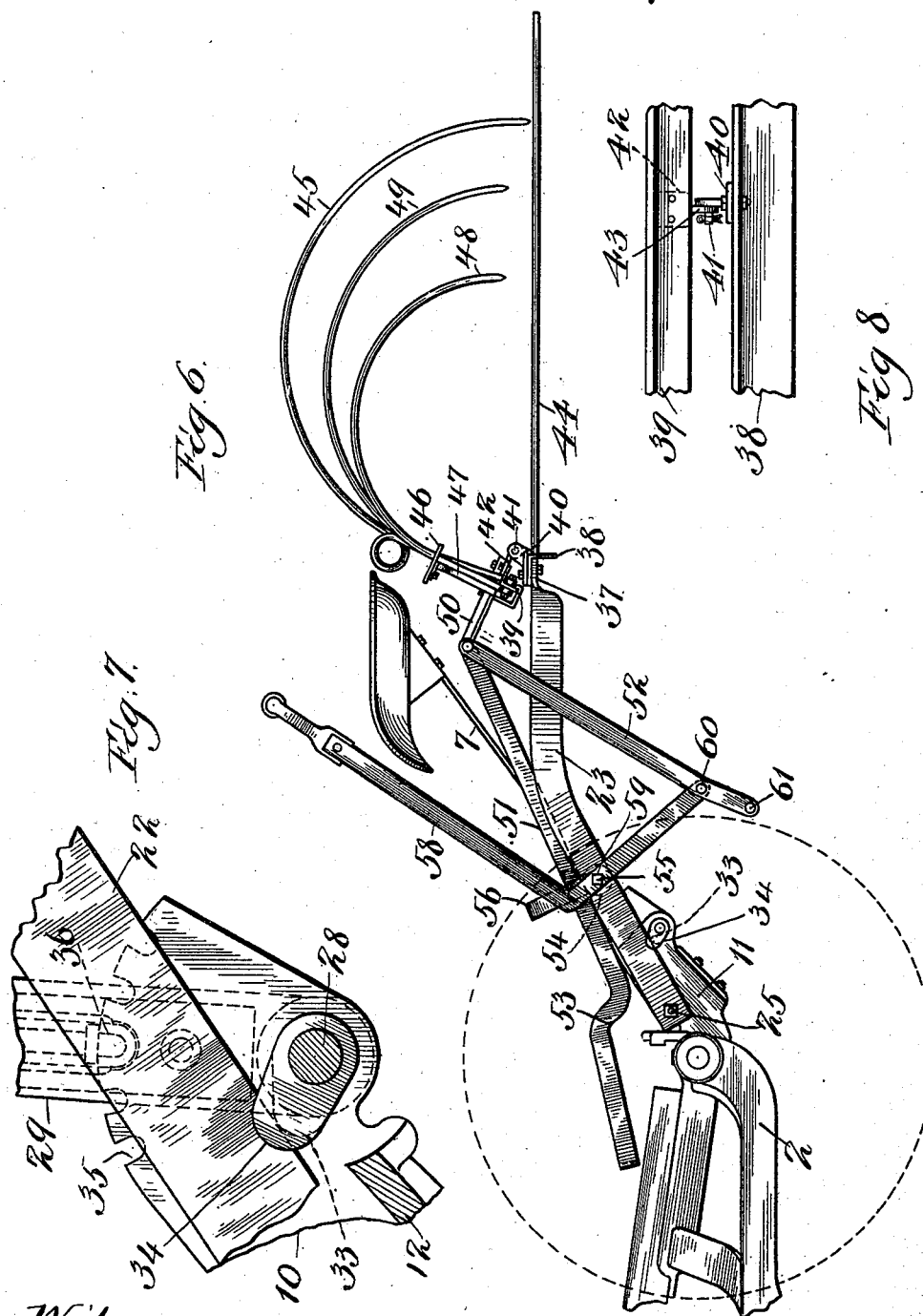
Witnesses
W. C. Corliss
Wm. Geiger
Inventor
Samuel K Dennis
By Coburn, Hibben & McElroy, Attys

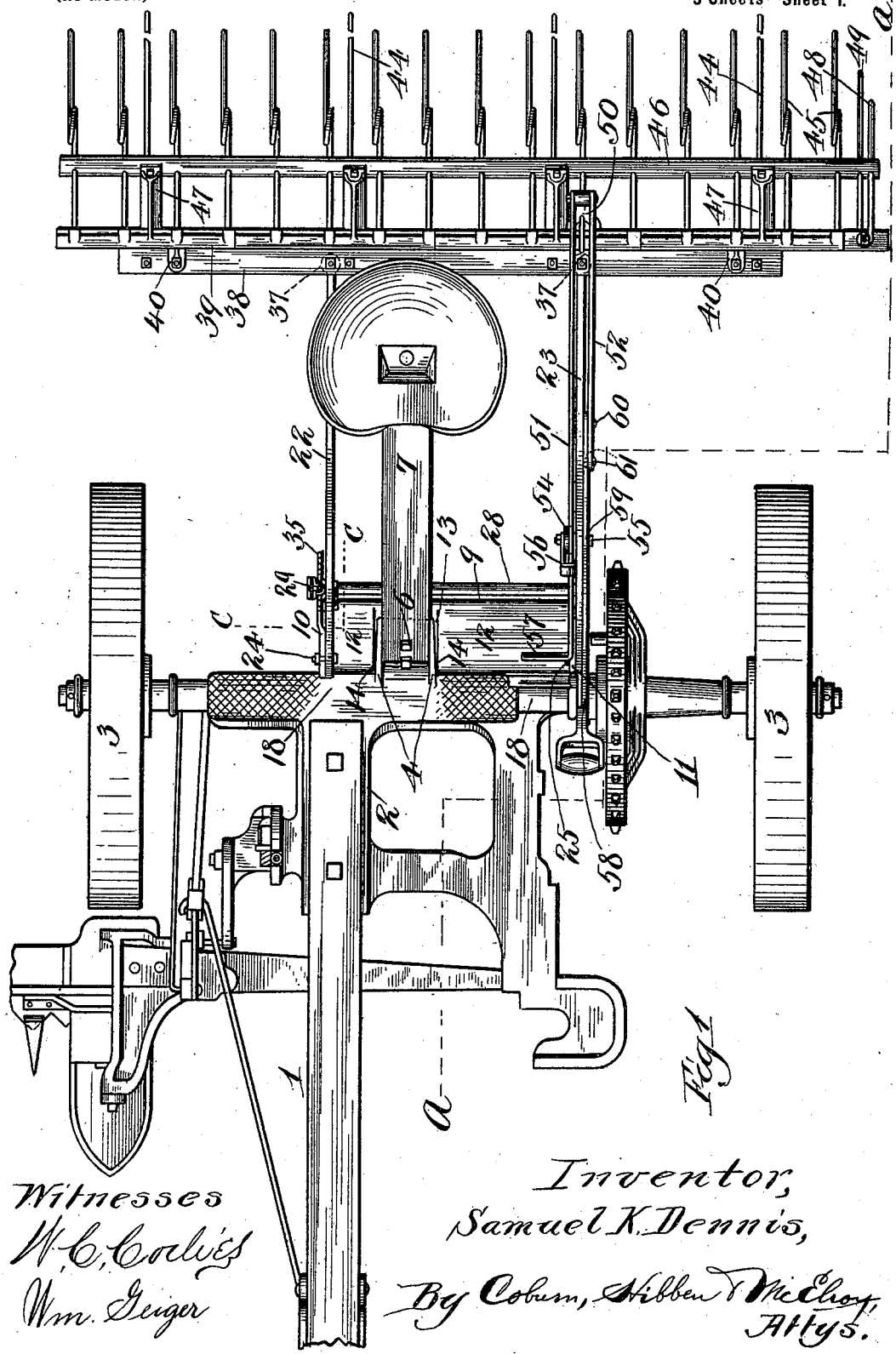

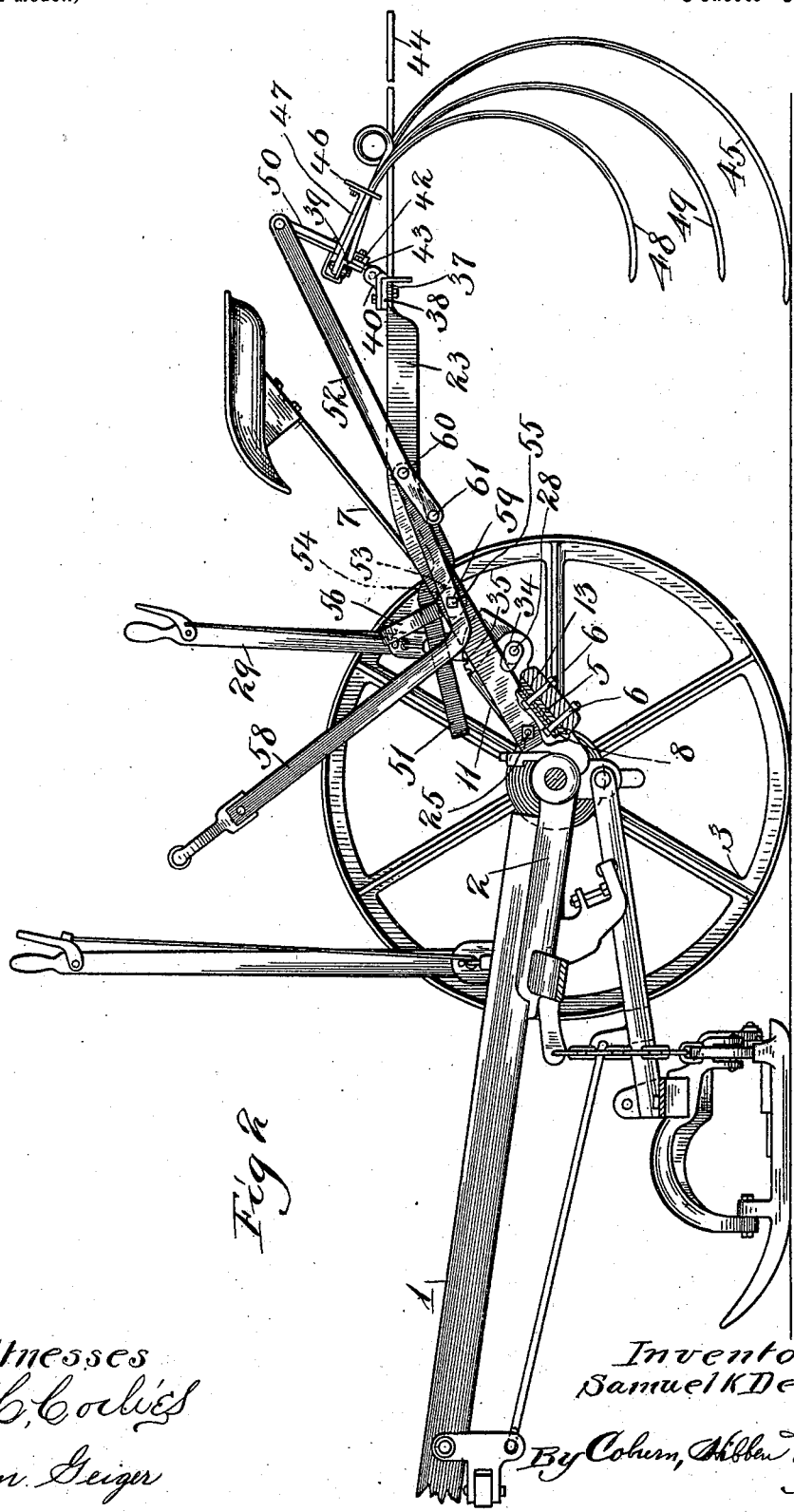

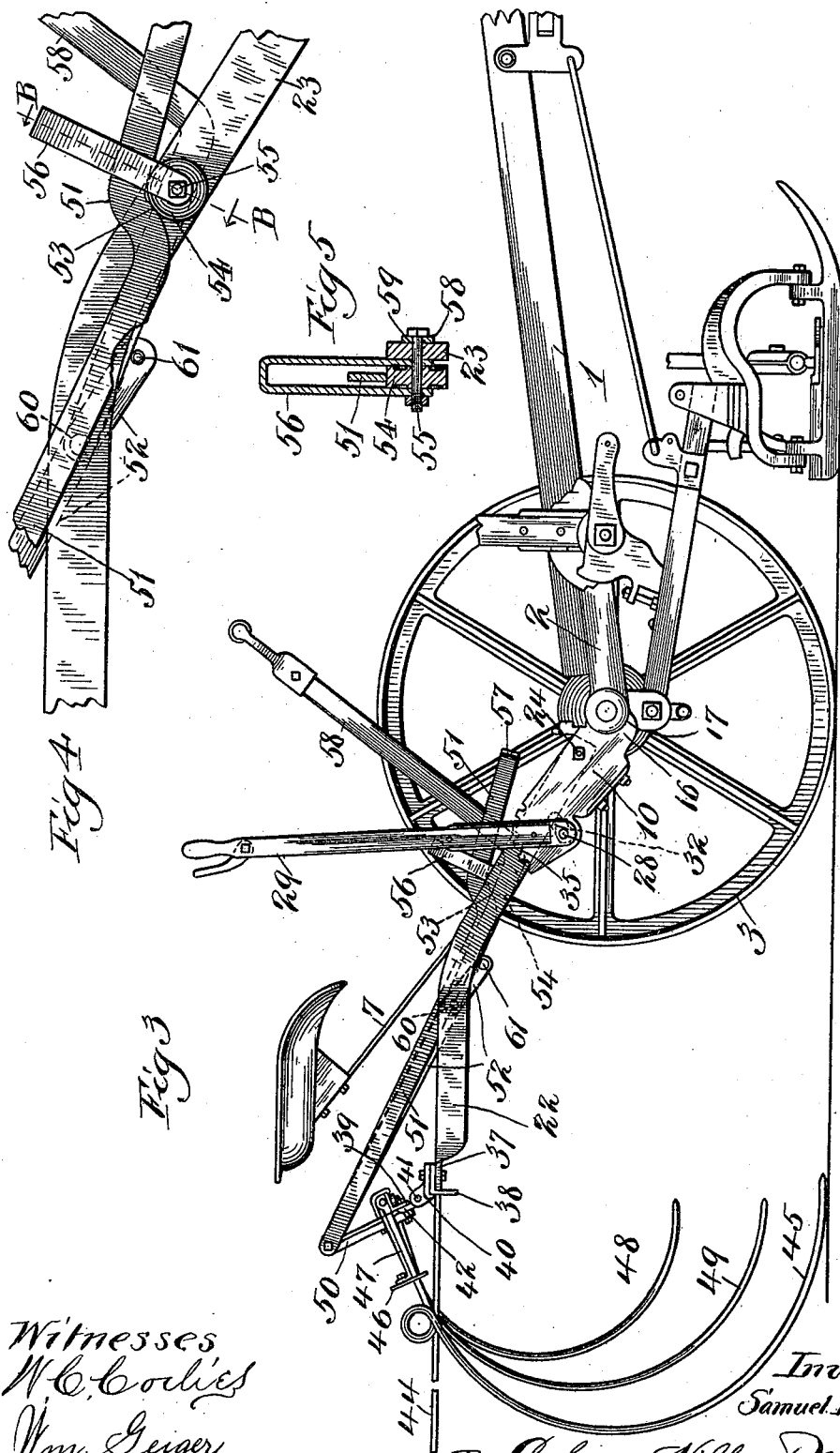

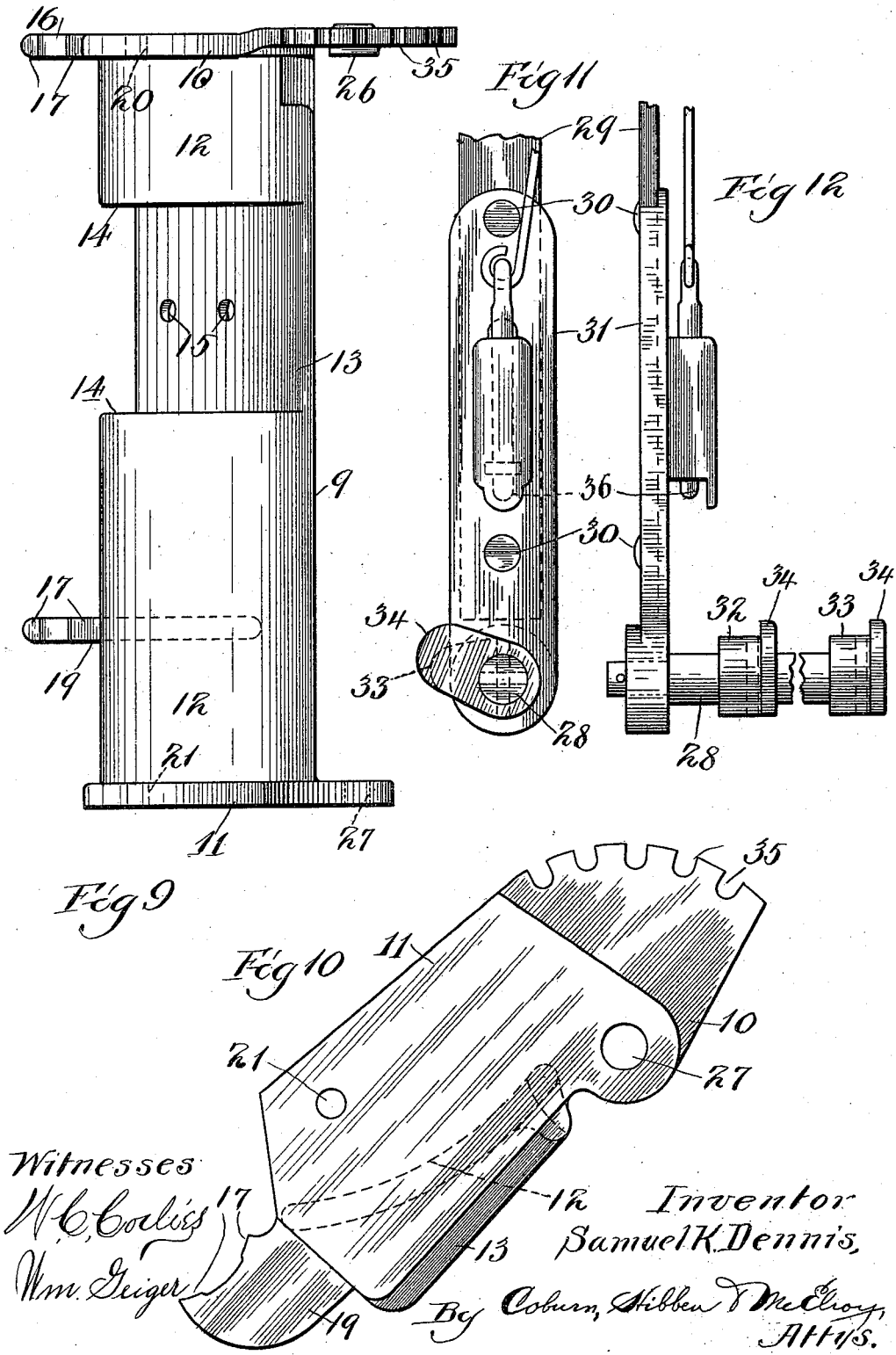

UNITED STATES PATENT OFFICE.

SAMUEL K. DENNIS, OF CHICAGO, ILLINOIS, ASSIGNOR TO THE PLANO MANUFACTURING COMPANY, OF CHICAGO, ILLINOIS, A CORPORATION OF ILLINOIS.

COMBINED MOWING-MACHINE AND HAY-RAKE.

SPECIFICATION forming part of Letters Patent No. 684,798, dated October 22, 1901.

Application filed June 20, 1900. Serial No. 20,954. (No model.)

*To all whom it may concern:*

Be it known that I, SAMUEL K. DENNIS, a resident of Chicago, in the county of Cook and State of Illinois, have invented certain new and useful Improvements in a Combined Mowing-Machine and Hay-Rake, of which the following is a specification.

My invention relates to a new and improved combined mowing-machine and hay-rake, and is designed to produce a machine by which hay that has been allowed to stand until it has been cured can be cut and raked by the same operation by a single operator and with but a single team.

In carrying out my invention I secure a rake to an ordinary mowing-machine, preferably so that it can be readily detached when it is not desired for use, and in such a manner that both machines can be operated simultaneously to rake up at any round the hay that has been cut during the preceding round.

Referring to the accompanying sheets of drawings, in which the same reference characters are used to designate identical parts in all the views, Figure 1 is a plan view of the complete device. Fig. 2 is a sectional view on the line A A of Fig. 1. Fig. 3 is a side elevation of the complete device. Fig. 4 is a detail view on an enlarged scale. Fig. 5 is a sectional view on the line B B of Fig. 4. Fig. 6 is a side elevation of the rake mechanism, showing it in its dumped position; and Figs. 7 to 12 are detail views on an enlarged scale.

The mowing-machine shown in the drawings is of the ordinary construction and will not be described in detail, as it is a feature of the invention only when considered in combination with the mechanism pertaining to the rake and its supports. It has the tongue 1, the frame 2, the carrying-wheels 3, and all the parts necessary to make a complete mowing-machine. The mechanism by which the rake is attached to the frame is best shown in Figs. 1, 2, 3, 9, and 10, where it will be seen that the mower-frame 2 has projecting rearwardly therefrom the flanges 4, (seen in Fig. 1,) the outer portions of which flanges are united by the web 5 joining their bottom edges, this web being shown in cross-section in Fig. 2. This web has the apertures therein through which pass the bolts 6, which serve to secure the seat-spring 7 and its supporting spring-plate 8 upon the web. Advantage is taken of these flanges to support the seat-spring to secure the bracket 9, which consists of the two vertical end flanges 10 and 11, which are connected by the web 12, (seen in plan view in Fig. 9,) and the general shape of which in section is shown in dotted lines in Fig. 10. This web has the depressed portion 13, which is offset from the flange 12, as seen at 14, and is provided with the bolt-holes 15, through which the bolts 6 pass to secure the bracket to the frame 2 of the machine. The arrangement of the parts, as will be best seen from Fig. 1, is such that the flanges 4 and their connecting-web 5 fit into the recess formed by the depressed or offset portion 13 of the bracket. To brace this bracket and give additional support thereto, the vertical end piece 10 is provided with a lug 16, which has curved bearing portions 17, arranged to rest against the tubular axle-bearing portions 18 of the mower-frame 2. A similar lug or projection 19, with the curved bearing portions 17, is secured toward the other end of the bracket between the depressed portion 13 and the end flange 11. The vertical end flanges 10 and 11 are provided with the bolt-holes 20 and 21, respectively, at which points the rake-support arms 22 and 23, respectively, are pivotally secured by the bolts 24 and 25 to said flanges. The end flanges 10 and 11 are also respectively provided near their rear and upper ends with the circular bearing-apertures 26 and 27, through which pass the rock-shaft 28, which has secured upon its left-hand end, looking from the front of the machine, the hand-lever 29, which is bolted, as shown at 30 in Figs. 11 and 12, to the supporting-casting 31, which is rigidly secured upon the end of the rock-shaft 28. This rock-shaft 28 has secured thereon at points directly beneath where the rake-support arms 22 and 23 cross it the cams 32 and 33, each of which is provided with the flange 34, coöperating with the arms 22 and 23 to prevent their lateral displacement. The vertical end flange 10 has secured upon its rear and upper end, preferably by casting integrally therewith, the toothed segment 35, which is concentric with the bearing-aperture 26, and the operating-lever 29 has the customary spring-pressed locking-pin 36, whose lower end coöperates with the notches in the segment 35 to hold the lever 29 securely in any desired position of adjustment. By reference to Fig. 7 it will be seen that as the operating-lever 29 is shifted from one position to another the angle of the rake-support arms 22 and 23 will be varied so as to raise and lower the rake-teeth, as may be necessary for adjusting it to compensate for the tilting of the mower on its axis caused by using different-sized teams.

The rake-support arms 22 and 23 have their rear ends formed with horizontal portions 37, by which they are bolted to the strip of angle-iron 38, to which the rake-tooth-supporting bar 39 is pivotally secured by the means best shown in Fig. 8, where it will be seen that a bracket 40, carrying a stud 41, coöperates with the bracket 42, secured to the supporting-bar 39 and having the eye 43, coöperating with the bearing-stud 41. The bar 38 carries the cleaning-fingers 44, and the rake-teeth 45 are supported by the bar 39 and its associated supporting-bar 46, to which it is connected by the brackets 47, the construction of the rake proper being in ordinary form. To prevent the possible escape of the hay or grass at the outer end of the rake, I arrange the two outermost teeth 48 and 49 on curves of lesser diameters than the other teeth, so that a kind of basket, as it were, is formed at that end which in no way interferes with the discharge of the load, but which prevents it escaping at that end while the rake is in contact with the ground.

To discharge the contents of the rake, I employ the mechanism best illustrated in Figs. 2, 3, 4, and 6, where it will be seen that a bracket 50, which is necessary to secure the required leverage, is secured upon the rake-teeth-supporting bar 39 or some of its rigidly-associated parts and has pivotally secured to its upper end a foot-bar 51 and the hand-lever link 52. The foot-bar 51 has formed therein toward its free front end the shoulder 53, which coöperates with an antifriction-roller 54, (best shown in Figs. 4 and 5,) which is mounted upon the bolt or bearing-stud 55, carried by the arm 23. To confine the foot-bar 51 in proper position on the antifriction-roller 54, I preferably provide the yoke 56, which extends upward from the antifriction-roller and has its ends secured on either side thereof by having the bolt or bearing-stud 55 passing therethrough. From a consideration of this structure as shown in its positions of rest in Figs. 2 and 3 it will be seen that the antifriction-roller 54, coöperating with the shoulder 53, serves as a yielding lock, as it were, to hold the rake-teeth down upon the ground against the dragging tendency of the hay to swing the rake upward. While this lock may be made sufficiently positive to hold the rake-teeth down under ordinary circumstances without any assistance, yet so that if any serious obstruction should be met with the shoulder 53 could ride up over the friction-roller 54, and thus prevent the breaking of any parts, I preferably construct or adjust this lock so that the weight of the operator's foot resting upon the angular end 57 of the foot-bar is necessary to aid the lock in holding the teeth yieldingly upon the ground. When it is desired to discharge the hay which has accumulated in the rake, the operator raises his foot from the angular end 57 of the foot-bar, and thus the intentional discharge of the accumulated hay is started by the weight of the hay starting the foot-bar forward and necessarily swinging the rake upward about its pivotal supports. To finish the operation of discharging the load, I provide a hand-lever 55, which is of a bell-crank form and is pivoted, as at 59, upon the same bearing bolt or stud 58 which carries the antifriction-roller 54 and the yoke 56 and preferably between the arm 23 and the head of the bolt, as clearly shown in section in Fig. 5. The hand-lever 58 has its lower end pivoted, as at 60, to the link 52, so that if the hand-lever is operated independently of the foot-lever the dumping action of the rake may be secured. The end of the link 52 extending beyond the pivotal point 60 is provided with the pin 61 which, when the hand and foot levers are in their normal position, as shown in Fig. 4, coöperates with the hand-lever 58 to hold it in its forward position. The preliminary movement given to the foot-bar by the weight of the hay is sufficient to bring the hand-lever 58 in easy reach of the operator, who by pulling it to the position shown in Fig. 6 completes the dumping. If the parts should be adjusted so that the weight of the hay alone is insufficient to start the movement of the foot-bar, it can be started by pushing with the foot along the length of the bar against its angular end 57.

The operation of the device will be apparent from the description of the construction heretofore given. The operator is seated upon the mowing-machine in the customary manner in reach of the operating-lever thereof and at the same time has the adjusting-lever 29 of the rake and the hand-lever 58 and the foot-bar 51 in easy reach, so that he can attend to the operation of the mowing-machine and the rake simultaneously.

It will be seen that I have produced a rake that can be readily secured to or detached from the mowing-machine and one which is secured thereto yieldingly and adjustably, so as to prevent any accidents and to adjust it to any desired position that the mowing-machine may assume. It will also be seen that I have provided a rake that is readily and easily operated and one that can automatically discharge itself, if necessary, to prevent any accidents.

While I have shown my rake as applied directly behind a side-cut machine, so that the hay cut by the preceding round will be operated on by the rake, it will be apparent that if a front-cut machine were employed the hay could be raked at the same round by which it is cut.

While I have shown and described the features of my invention as embodied in a combined mowing-machine and rake, it will be understood that some features of the same might be used in connection with a rake alone, and that in claiming these features I do not desire to be limited in their use to a combined mowing-machine and rake.

While I have shown my invention as embodied in the form which I at present consider best adapted to carry out its purposes, it will be understood that it is capable of modifications, and that I do not desire to be limited in the interpretation of the following claims, except as may be necessitated by the state of the art.

What I claim as new, and desire to secure by Letters Patent of the United States, is—

1. In a device of the class described, the combination with the mowing-machine, of a rake and its operating mechanism, a support for said rake carried by the mowing-machine and consisting of the arms 22 and 23 pivotally secured at their front ends to the machine and carrying the rake at their rear ends, and adjusting mechanism located intermediate of said ends whereby the position of the rake relative to the machine may be varied greatly, said mechanism consisting of the rock-shaft 28 carrying the cams 32 and 33 coöperating with the arms 22 and 23, and means for securing said shaft in any desired position of adjustment comprising the gear-segment 35 concentric with the shaft, and the lever 29 secured to the shaft 28 and having the locking-dog 36 thereon coöperating with the segment.

2. In a device of the class described, the combination with the mowing-machine, of a rake and its operating mechanism, a support for said rake carried by the mowing-machine and consisting of the arms 22 and 23 pivotally secured at their front ends to the machine and carrying the rake at their rear ends, and adjusting mechanism located intermediate of said ends whereby the position of the rake relative to the machine may be varied greatly, said mechanism consisting of the rock-shaft 28 carrying the cams 32 and 33 provided with the flanges 34 supporting and positioning the arms 22 and 23, and means for securing said shaft in any desired position of adjustment.

3. In a device of the class described, the bracket 9 having the end flanges 10 and 11 adapted to carry the supporting-arms, the web 12 connecting said flanges, the lugs 16 and 19 adapted to coöperate with the tubular axle-bearing portion of the mowing-machine frame, and the offset portion 13 of the bracket adapted to receive the seat-spring-supporting bracket and to be secured thereto.

4. In a device of the class described, the bracket 9 having the end flanges 10 and 11 provided with the bolt-holes 20 and 21 and the bearing-apertures 26 and 27, the web 12 connecting said flanges, the lugs 16 and 19 having the curved bearing portion 17 adapted to coöperate with the tubular axle-bearing portion of the mowing-machine frame, and the offset portion 13 adapted to receive the seat-spring-supporting bracket and to be secured thereto.

5. In a device of the class described, the bracket 9 having the end flanges 10 and 11 having the bolt-holes 20 and 21 and the bearing-apertures 26 and 27 therein, the end flange 10 terminating in the notched segment 35 concentric with the bearing-aperture 26, the web 12 connecting said flanges 10 and 11, the lugs 16 and 19 adapted to coöperate with the tubular axle-bearing portion of the mowing-machine frame, and the offset portion 13 adapted to receive the seat-spring-supporting bracket and to be secured thereto.

6. In a device of the class described, the combination with the bracket 9 having the end flanges 10 and 11 having the bolt-holes 20 and 21 and the bearing-apertures 26 and 27, the lugs 16 and 19 adapted to coöperate with the tubular axle-bearing portion of the mowing-machine frame, and the offset portion 13 adapted to receive the seat-spring-supporting bracket and to be secured thereto; with the rock-shaft 28 mounted in the bearings 26 and 27 and having the cams 32 and 33 thereon, and the arms 22 and 23 pivoted to the bracket by means of bolts passing through the bolt-holes 20 and 21 and supported by the cams 32 and 33.

7. In a device of the class described, the combination with the bracket 9 having the end flanges 10 and 11 provided with the bolt-holes 20 and 21 and the bearing-apertures 26 and 27, the end flange 10 terminating in the notched segment 35 concentric with the bearing-aperture 26, the web 12 connecting said flanges, the lugs 16 and 19 adapted to coöperate with the tubular axle-bearing portion of the mowing-machine frame, and the offset portion 13 adapted to receive the seat-spring-supporting bracket and to be secured thereto; of the rock-shaft 28 mounted in the bearing-apertures 26 and 27 and provided with the lever 29 having the locking-dog 36 thereon coöperating with the segment 35, the cams 32 and 33 secured on the shaft 28; and the rake-supporting arms 22 and 23 pivotally secured to said end flanges by bolts passing through the bolt-holes 20 and 21, and supported upon said cams 32 and 33.

8. In a rake, the combination with the relatively stationary rake-supporting bar, of the rake-tooth-carrying bar pivoted thereto, and discharge mechanism therefor including a yielding lock normally operative to prevent accidental discharge but automatically yielding to prevent breaking.

9. In a rake, the combination with the relatively stationary rake-supporting bar, of the rake-tooth-carrying bar pivoted thereto, and discharge mechanism therefor including a yielding lock normally operative to prevent accidental discharge, said mechanism including a bar 51 secured to move with the rake-tooth-carrying bar and having the shoulder 53 thereon coöperating with an abutment, such as the antifriction-roller 54, on a stationary part of the machine, the shoulder 53 being shaped so as to yield automatically to prevent breaking.

10. In a rake, the combination with the relatively stationary rake-supporting bar, of the rake-tooth-carrying bar pivoted thereto, and discharge mechanism therefor including a yielding lock normally operative to prevent accidental discharge, said mechanism including a bar 51 pivotally secured to the rake-tooth-carrying bar having the angular end 57 adapted to receive the operator's foot, and having the shoulder 53 thereon coöperating with an abutment, such as the antifriction-roller 54, on a stationary part of the machine, the shoulder 53 being shaped so as to yield automatically to prevent breaking.

11. In a rake, the combination with the relatively stationary rake-supporting bar, of the rake-tooth-carrying bar pivoted thereto, and discharge mechanism therefor including the hand-lever link 52 pivoted to the rake-tooth-carrying bar, the bell-crank hand-lever 58 having one arm pivoted at its outer end to the link 52, said arm being normally substantially in line with said link, the hand-lever 58 being pivotally secured to a stationary part of the framework by a pivot located in the above-mentioned arm, together with the bar 51 also pivoted to the rake-tooth-carrying bar and having the angular end 57 adapted to receive the operator's foot, the outer free end of the bar 51 being suitably supported and adapted to slide forward as the rake is raised to discharge its contents.

12. In a rake, the combination with the relatively stationary rake-supporting bar, of the rake-tooth-carrying bar pivoted thereto, discharge mechanism therefor including the hand-lever link 52 pivoted to the rake-tooth-carrying bar, the bell-crank hand-lever 58 having one arm pivoted at its outer end to the link 52, said arm being normally substantially in line with said link, the hand-lever 58 being pivotally secured to a stationary part of the framework by a pivot located in the above-mentioned arm, together with the bar 51 also pivoted to the rake-tooth-carrying bar and having the angular end 57 adapted to receive the operator's foot, the outer free end of the bar 51 being suitably supported and adapted to slide forward as the rake is raised to discharge its contents, and an automatically-yielding lock for said bar 51 normally operative to prevent accidental discharge.

13. In a rake, the combination with the relatively stationary rake-supporting bar, of the rake-tooth-carrying bar pivoted thereto, and discharge mechanism therefor including an automatically-yielding lock normally operative to prevent accidental discharge together with the hand-lever link 52 pivoted to the rake-tooth-carrying bar, and the bell-crank lever 58 having one arm pivoted at its outer end to the link 52, said arm being normally substantially in line therewith, the hand-lever 58 being pivotally secured to the stationary framework by a pivot located in the above-mentioned arm.

14. In a rake, the combination with the relatively stationary rake-supporting bar, of the rake-tooth-carrying bar pivoted thereto, a discharge mechanism therefor including the arm 50 projecting from said rake-tooth-carrying bar and having the bar 51 and the hand-lever link 52 pivotally mounted thereto, the bar 51 having the shoulder 33 therein coöperating with an abutment, such as the antifriction-roller, on a stationary part of the machine, such abutment and shoulder being so shaped as to form an automatically-yielding lock, and the hand-lever link 52 having its other end pivotally secured to the bell-crank hand-lever 58 which is pivotally secured to the stationary frame where in line with the abutment 54.

15. In a rake, the combination with the relatively stationary rake-supporting bar, of the rake-tooth-carrying bar pivoted thereto, and discharge mechanism therefor consisting of the arm 50 secured to the rake-tooth-carrying bar, the bar 51 and the hand-lever link 52 pivoted to the arm 50 at their rear ends, a pivotal bearing-bolt 55 carried by a stationary part of the frame and having pivoted thereon the bell-crank hand-lever 58 having its inner end pivotally secured to the link 52 together with the antifriction-roller 54, the yoke 56 embracing the antifriction-roller, the bar 51 passing through said yoke and having a sloping shoulder 53 adapted to coöperate with the antifriction-roller 54, substantially as and for the purpose described.

SAMUEL K. DENNIS.

Witnesses:
O. W. JONES,
E. J. TAYLOR.